(12) United States Patent
Bauer et al.

(10) Patent No.: US 8,054,083 B2
(45) Date of Patent: Nov. 8, 2011

(54) METHOD AND APPARATUS FOR DIAGNOSING A MOTOR CONTROL CIRCUIT IN A HYBRID VEHICLE

(75) Inventors: Harry J. Bauer, Troy, MI (US); Wei D. Wang, Troy, MI (US); Bon Ho Bae, Torrance, CA (US); William R. Cawthorne, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 404 days.

(21) Appl. No.: 12/392,603

(22) Filed: Feb. 25, 2009

(65) Prior Publication Data

US 2010/0213948 A1    Aug. 26, 2010

(51) Int. Cl.
*G01R 31/00* (2006.01)
(52) U.S. Cl. ........................................................ 324/503
(58) Field of Classification Search ........................ None
See application file for complete search history.

(56) References Cited

U.S. PATENT DOCUMENTS

| 2005/0254273 | A1* | 11/2005 | Soudier et al. | 363/103 |
| 2007/0013333 | A1* | 1/2007 | Ajima et al. | 318/432 |
| 2007/0219749 | A1* | 9/2007 | Jayabalan et al. | 702/182 |
| 2008/0150573 | A1* | 6/2008 | Fu et al. | 324/772 |

* cited by examiner

*Primary Examiner* — Melissa Koval
*Assistant Examiner* — Robert Grant
(74) *Attorney, Agent, or Firm* — Quinn Law Group, PLLC

(57) ABSTRACT

A hybrid electric vehicle (HEV) has an algorithm for executing a method for diagnosing a high-voltage (HV) fault condition aboard the HEV. The HEV includes a high-voltage (HV) battery, an auxiliary power module (APM), a power inverter module (PIM), and a three-phase motor/generator unit (MGU). A controller executes the method to thereby measure a DC output current from the HV battery, a DC inlet current into the APM, and a pair of AC phase currents in the MGU. The method further includes calculating a DC inlet current into the PIM using the AC phase currents, diagnosing the HV fault condition using the DC output currents and the DC inlet currents, and executing a control action in response to the diagnosed condition. The method can include shutting off the APM to determine whether the APM is the root cause of the HV fault condition.

13 Claims, 4 Drawing Sheets

US 8,054,083 B2

METHOD AND APPARATUS FOR DIAGNOSING A MOTOR CONTROL CIRCUIT IN A HYBRID VEHICLE

TECHNICAL FIELD

The present invention relates to a method and apparatus for diagnosing a motor control circuit onboard a hybrid electrical vehicle, and in particular to diagnosing a potential high-voltage electrical fault condition in a component thereof.

BACKGROUND OF THE INVENTION

In a three-phase permanent magnet and induction-type motor, an application of a three-phase alternating current (AC) voltage to the stator windings induces a changing magnetic field around the rotor, with the force of an opposing magnetic field, whether induced or generated by a set of permanent magnets, causing a rotor shaft to rotate. Torque provided by the rotor shaft then can be harnessed and directed as needed for performing useful mechanical work within a system. For example, the rotor shaft can drive a belted alternator starter (BAS) system of a mild hybrid electric vehicle to enable rapid restart of the HEV after an Auto Stop event. Likewise, the rotor shaft can be selectively connected to a transmission shaft in a full hybrid design to electrically propel the vehicle.

To ensure proper functioning of the various components of a motor control circuit aboard the HEV, such as the electrical motor or motor/generator unit (MGU), an auxiliary power module (APM), and a power inverter module (PIM), a phase current sensor is ordinarily positioned within the MGU to directly measure each of the three phase currents transmitted to the MGU from the PIM. An electronic control unit or controller in communication with each of the three-phase current sensors can determine a phase current error by adding the various phase currents together and setting a diagnostic failure condition when the sum exceeds a zero value or a near-zero calibrated threshold. Such methods may be less than optimal for certain purposes, including the use of three different phase current sensors within the motor control circuit.

SUMMARY OF THE INVENTION

Accordingly, a method is provided for determining a high-voltage (HV) electrical fault condition aboard an HEV having a motor control circuit including an HV battery, an MGU, an APM, and a PIM. Such an MGU can be used, for example, as part of a belted alternator starter (BAS) system to selectively restart the HEV after an Auto Stop event. Within the scope of the invention, the motor control circuit utilizes only a pair of phase current sensors in conjunction with a pair of DC current sensors, with one DC current sensor positioned for measuring the DC output current from the HV battery, and another DC current sensor for measuring the DC inlet current into the APM. The DC inlet current into the PIM is not directly measured, but rather is calculated by an electronic control unit or controller containing or having access to an algorithm suitable for executing the method of the invention, as set forth in detail hereinbelow.

In particular, the method or algorithm uses phase current measurements provided by the pair of phase current sensors to perform a series of calculations and threshold comparison steps. For example, the DC inlet current into the APM and PIM are subtracted from the DC output current from the HV battery, and the result is compared to a calibrated threshold to determine whether a predetermined HV fault condition exists aboard the HEV. The failed component can then be isolated, and an appropriate control action or corrective action can be executed as needed depending on the component that is diagnosed as being the root cause of the HV fault condition.

That is, if the APM is determined to be the source or root cause of the HV fault condition, the controller can continue to allow propulsive torque to be generated aboard the HEV, and likewise can disable torque generation if one of the HV battery or the PIM are determined to be the source. Regardless of which component is diagnosed as being the likely source, the controller can selectively activate an audio/visual device within the HEV, and/or can set one or more failure flags and/or diagnostic codes for the failed component, or take any other suitable control action.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
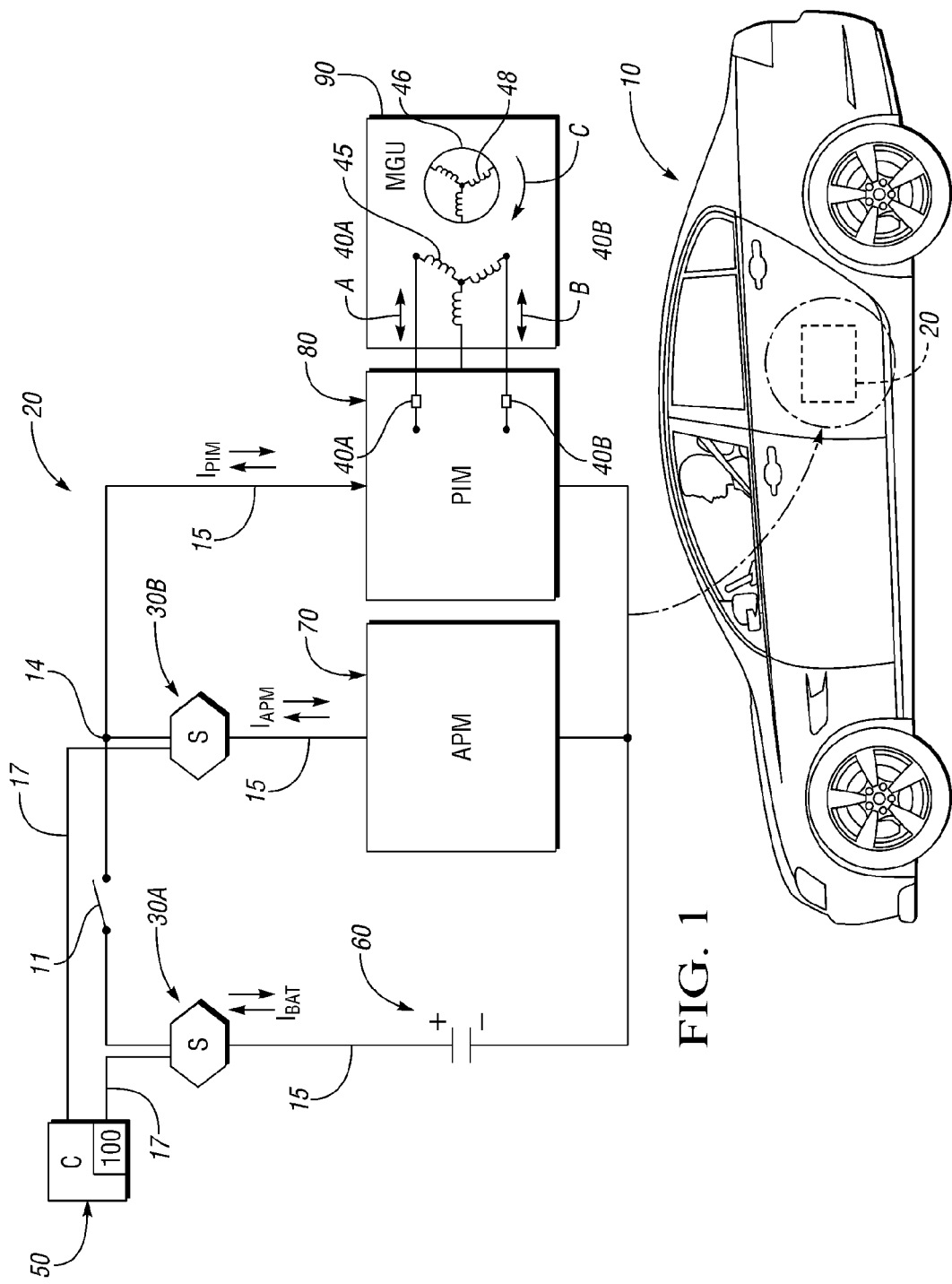
FIG. 1 is a schematic illustration of a hybrid electric vehicle or HEV having motor control circuit in accordance with the invention.

With reference to the drawings, wherein like reference numbers refer to the same or similar components throughout the several views, and beginning with FIG. 1, a hybrid electric vehicle or HEV 10 includes a motor control circuit 20. The motor control circuit 20 includes an electronic control unit or controller (C) 50 having an algorithm 100 for diagnosing a high-voltage (HV) electrical fault condition aboard the HEV 10, and for controlling the power flow to various components of the HEV 10. In an exemplary embodiment, the HEV 10 is configured as a mild hybrid, and therefore includes a motor/generator unit or MGU 90 suitable for use in a belted alternator starter (BAS) system. As will be understood by those of ordinary skill in the art, a BAS system can utilize an MGU to rotate an engine serpentine belt (not shown) after an Auto Stop event, e.g., a temporary engine-off state to conserve fuel when the HEV 10 is stopped at an intersection, a parking lot, or other temporary idle conditions, thereby rapidly resuming travel of the HEV 10.

The motor control circuit 20 includes an HV energy storage system or HV battery 60, such as approximately 60-300 volts (V) or more, which delivers a supply of DC current to an auxiliary or accessory power module (APM) 70 and an electric motor inverter or power inverter module (PIM) 80, and ultimately to the MGU 90. Within the scope of the invention, the APM 70 can be configured as a DC-DC power converter adapted to convert a supply of DC power from a relatively high voltage level of the HV battery 60 to a lower voltage level suitable for powering one or more accessories (not shown)

onboard the HEV 10, e.g., a radio, electronic braking system, power seats, windows, door locks, etc., and vice versa, as determined by an electronic control unit or controller (C) 50. The lower or auxiliary voltage level, usually approximately 12-14V, is suitable for charging an auxiliary battery (not shown) and/or directly powering one or more auxiliary systems (not shown) aboard the HEV 10 as needed.

The controller 50 can be configured as a distributed or a central control module having such control modules and capabilities as might be necessary to execute all required power flow control functionality aboard the HEV 10 in the desired manner. Additionally, the controller 50 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Any algorithms resident in the controller 50 or accessible thereby, including a motor control algorithm 100 in accordance with the invention as described below, can be stored in ROM and executed to provide the respective functionality.

Still referring to FIG. 1, the controller 50 is electrically connected to each of the HV battery 60, the APM 70, the PIM 80, and the MGU 90 via an HV connection, referred to hereinafter as the HV bus 15. A set of DC current sensors (S) 30A, 30B are positioned within the motor control circuit 20 to sense, detect, measure, or otherwise determine the amplitude of a bi-directional DC electrical current flowing between the HV battery 60 and the APM 70. The DC output current delivered from the HV battery 60 is represented in FIG. 1 as the bi-directional arrows $I_{BAT}$, and is conducted or transmitted through the HV bus 15 to a node 14 of the motor control circuit 20. The DC current ($I_{BAT}$) splits at node 14, with a first portion acting as a DC inlet current ($I_{APM}$) for energizing the APM 70 and a second portion acting as a DC inlet current ($I_{PIM}$) energizing the PIM 80.

As discussed briefly above, the motor control circuit 20 includes the pair of DC current sensors (S) 30A, 30B. Additionally, the motor control circuit 20 includes a pair of AC phase current sensors 40A, 40B, which as shown can be positioned or integrated within the PIM 80 to reduce wiring costs. The phase current sensors 40A, 40B measure only two of the three bi-directional AC phase currents that are delivered to stator windings 45 of a stator portion of the MGU 90, with the two phase currents represented in FIG. 1 by the bi-directional arrows A and B. A magnetic field induced within the stator of the MGU 90 ultimately energizes a set of rotor windings 48 of a rotor portion 46 thereof, thereby rotating the rotor portion 46 as indicated by the arrow C.

Using only the two measured phase currents (arrows A, B) from the phase current sensors 40A, 40B, a DC inlet current to the PIM 80 ($I_{PIM}$) can be calculated by the algorithm 100 of the controller 50. That is, both current sensors 30A, 30B feed their respective current readings to the controller 50 via a hardwired or wireless link or control path 17 for use by an algorithm 100, which is resident within or otherwise readily accessible by the controller 50. The controller 50 is also in hard-wired or wireless communication with the pair of current sensors 30A, 30B via another control path 17, such that the controller 50 can directly measure or quickly calculate or otherwise determine each of the required bi-directional electrical current values, i.e., $I_{BAT}$, $I_{APM}$, $I_{PIM}$, and the pair of phase currents represented by arrows A and B.

Figure 2:
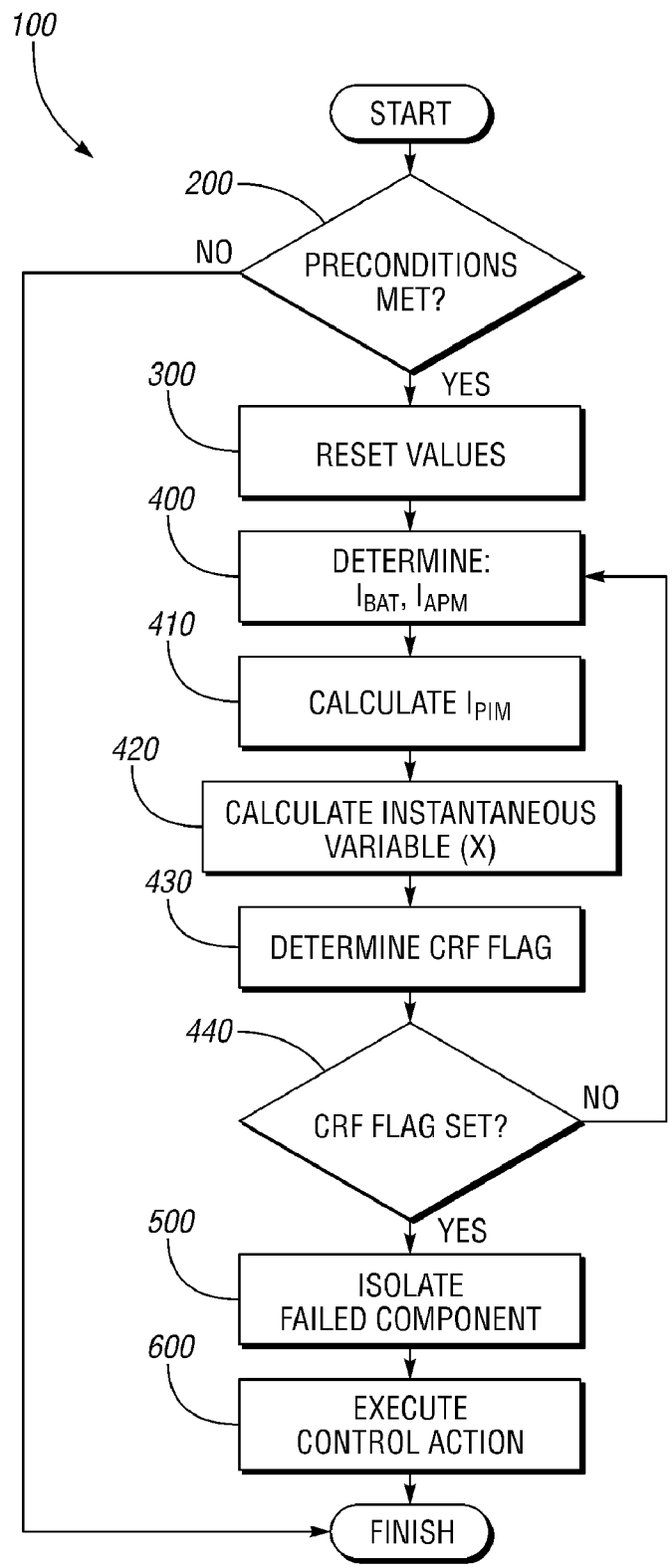
FIG. 2 is a graphical flow chart describing a method or an algorithm for performing a current sensor rationality diagnostic aboard the HEV of FIG. 1.

Referring to FIG. 2, and with particular reference to the various components of the HEV 10 of FIG. 1, the controller 50 is adapted to execute the method of the invention via the algorithm 100 in order to perform or execute an electrical current sensor rationality diagnostic check for the HEV 10, i.e., to diagnose an HV fault condition aboard the HEV 10. Such an HV fault condition can include, for example, a failure in any of the sensors 30A, 30B, 40A, 40B, an electrical short between the HV bus 15 of the HEV and the chassis of the HEV 10, an electrical short between a phase winding of the MGU 90, frayed cabling, etc.

The algorithm 100 begins at step 200, wherein the controller 50 verifies whether one or more preconditions are met for continuing with execution of the algorithm 100. An exemplary set of such preconditions for continuing with execution of the algorithm 100 includes a determination that a vehicle key or ignition is set to "run" and a high-voltage battery contactor is closed, as described later below with reference to FIG. 3. If these or other desired preconditions are not met, then the algorithm 100 is finished. The controller 50 can resume with step 200 anew after a predetermined wait period, effectively repeating step 200 in a loop thereafter until the required preconditions have been met. Once the controller 50 determines that the preconditions of step 200 have been met, the controller 50 proceeds to step 300.

At step 300, the controller 50 can reset a set of values for a number of unsigned integer counters and/or associated pass, fail, and sample flags. For example, the controller 50 can reset or zero each of a "Fail Counter" flag, a "Sample Counter" flag, and a "Current Sensor Rationality Failure (CRF) Flag". Once the required values have been reset or zeroed, the algorithm 100 proceeds to step 400.

At step 400, the controller 50 receives or extracts data from the DC current sensors 30A, 30B in order to determine the values of the measured DC outlet and inlet currents, i.e., $I_{BAT}$ and $I_{APM}$, respectively. These values can be temporarily stored or recorded in memory. The controller 50 then proceeds to step 410.

At step 410, the algorithm 100 calculates the value of the DC inlet current for the PIM 80 ($I_{PIM}$) using the measured AC phase currents from the two phase current sensors 40A, 40B (arrows A, B), and records this value in memory. For example, the DC current for a given pulse width modulation (PWM) cycle can be calculated using the three phase currents, with the measured two phase currents being used to calculate the third. That is, as shown in FIG. 1 phases A and B are measured with current sensors 30A, 30B while phase C, which does not have an associated sensor, being calculated from phases A and B.

As will be understood by those of ordinary skill in the art, given a high or fast enough sampling rate, the two instantaneous phase current measurements can be thought of as the non-changing or constant phase current over the sampling period. Together with known set of PWM duty cycles applied to control three phase insulated gate bipolar transistors or IGBT, one could calculate the average PIM inlet DC current (I_dc) over this PWM cycle, using the formula: I_dc=(Da−Dc)*Ia+(Db−Dc)*Ib, where the variables Da, Db, and Dc are the controlled duty cycle for the three phase IGBT, and wherein the variables Ia and Ib are the A and B phase currents measured in the sample. One could also take an average over a predetermined number of samples to get a mean DC current value for a better filtered version of the DC current calculation. However determined, once the value of the DC inlet current ($I_{PIM}$) is known, the algorithm 100 proceeds to step 420.

At step 420, the controller 50 calculates an instantaneous value (X) using the following absolute value equation: $X=|I_{BAT}-I_{APM}-I_{INV}|$. If this instantaneous value (X) is greater than a failure threshold over a calibrated period, then the "Failure Counter" can be incremented. The controller 50 also records or otherwise notes that it has collected samples or performed a sampling operation by any suitable means, such as by incrementing a designated "Sample Counter" variable.

In an exemplary embodiment, the instantaneous value (X) can be calculated over an approximately 200 millisecond (ms) interval using a control loop of approximately 10 ms, although other intervals and/or control loop cycle times can also be used without departing from the intended scope of the invention. After completing step 420, the algorithm 100 proceeds to step 430.

At step 430, the value of a Current Sensor Rationality (CRF) flag can be determined using the following logic: if the value of the Failure Counter is greater than a pre-calibrated threshold number, then the CRF flag can be set to "1", "true", "pass", or any another suitable value. Otherwise, the CRF flag can be set to "0", "false", "fail", or any other suitable value.

In an exemplary embodiment, the controller 50 can be programmed to gather or collect approximately 25 samples, with approximately 20 of these samples required to be above the threshold failure value. Alternately, a "fast pass" criteria can be provided within the scope of the invention. By way of example, if at sample 7 of 25 a fail sample has not yet been determined by the algorithm 100, it will be logically impossible to achieve 20 failures within the exemplary designated sample size of 25, i.e., 25−7=18. Instead, the controller 50 can reset the sampling window and begin sampling anew. After determining the value of the CRF flag at step 430, the algorithm 100 proceeds to step 440.

At step 440, the value of the CRF flag can be used to determine the next course of action. That is, if the CRF flag is set to "false", then the controller 50 can repeat step 400, as the current values appear to be rational or not unusual. If the CRF flag is set to "true", then the controller 50 proceeds to step 500.

At step 500, an embodiment of which is described in further detail in FIG. 4 as explained below, the controller 50 isolates the likely failed component or components of the motor control circuit 20 leading to the diagnosed sensor irrationality of the system. After isolating the failed component, the algorithm 100 proceeds to step 600.

At step 600, the controller 50 executes one or more suitable control actions in response to the failed component. The control action can vary depending on the particular component determined to be the root cause of the sensor irrationality. For example, a complete shutdown of the HEV 10 can be executed if one of the HV battery 60 and the PIM 80 are determined to be the root cause of the failure, thus preventing generation of propulsive torque aboard the HEV 10. If the APM 70 is determined to be the root cause, propulsive torque can remain enabled.

In either case, the controller 50 can set a component failure flag or a diagnostic code to facilitate service or maintenance. Such a code could be transmitted to a remote location via a telematics system (not shown) if the HEV 10 is so equipped. Likewise, a check engine light and/or other audio/visual audio alarm can be selectively activated within the passenger compartment of the HEV 10 to alert a driver to the potential HV electrical fault. Once an appropriate control action has been executed, the algorithm 100 is finished.

Figure 3:
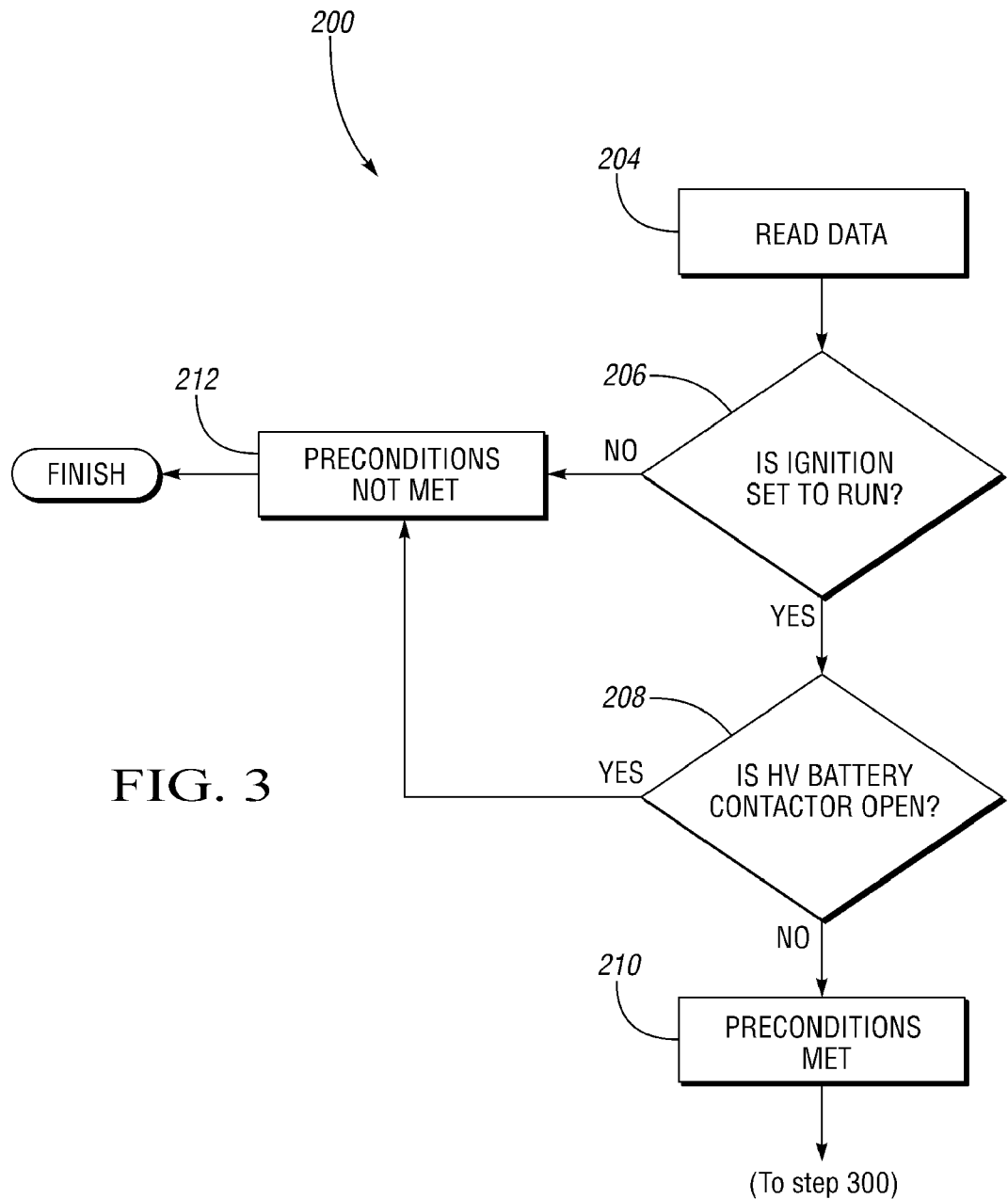
FIG. 3 is a graphical flow chart describing exemplary pre-condition checks suitable for use with the algorithm of FIG. 2.

Referring to FIG. 3, an exemplary set of preconditions for step 200 (see FIG. 2) of algorithm 100 begins with step 204, wherein the controller 50 receives, reads, senses, or otherwise determines values corresponding to a set of threshold vehicle conditions. In the embodiment of FIG. 3, the data required for determining the presence or absence of preconditions includes the position or state of an ignition key, switch, button, or other on/off start device of the HEV 10, and/or a state of an HV relay or contactor 11 in the motor control circuit 20 that automatically closes when the HEV 10 is started. Once such data is determined, the algorithm 100 proceeds to step 206.

At step 206, the algorithm 100 determines whether the data determined at step 204 corresponds to a predetermined vehicle state as explained above, i.e., the ignition or vehicle key is set to "run". If the precondition of step 206 is not met, the algorithm 100 proceeds to step 212, with the algorithm 100 otherwise proceeding to step 208.

At step 208, if the key position is set to run, then the controller 50 can verify that the HEV 10 is running by determining an open/closed state of the contactor 11. If the contactor 11 is closed, then the controller 50 proceeds to step 210, with the algorithm 100 otherwise proceeding to step 212.

At step 212, the algorithm 100 determines that the required preconditions of steps 206 and 208 are met. In response to this determination, the controller can set a flag or take any other suitable action enabling continued execution of the algorithm 100. The algorithm 100 then proceeds to step 300, as explained above with reference to FIG. 2.

Figure 4:
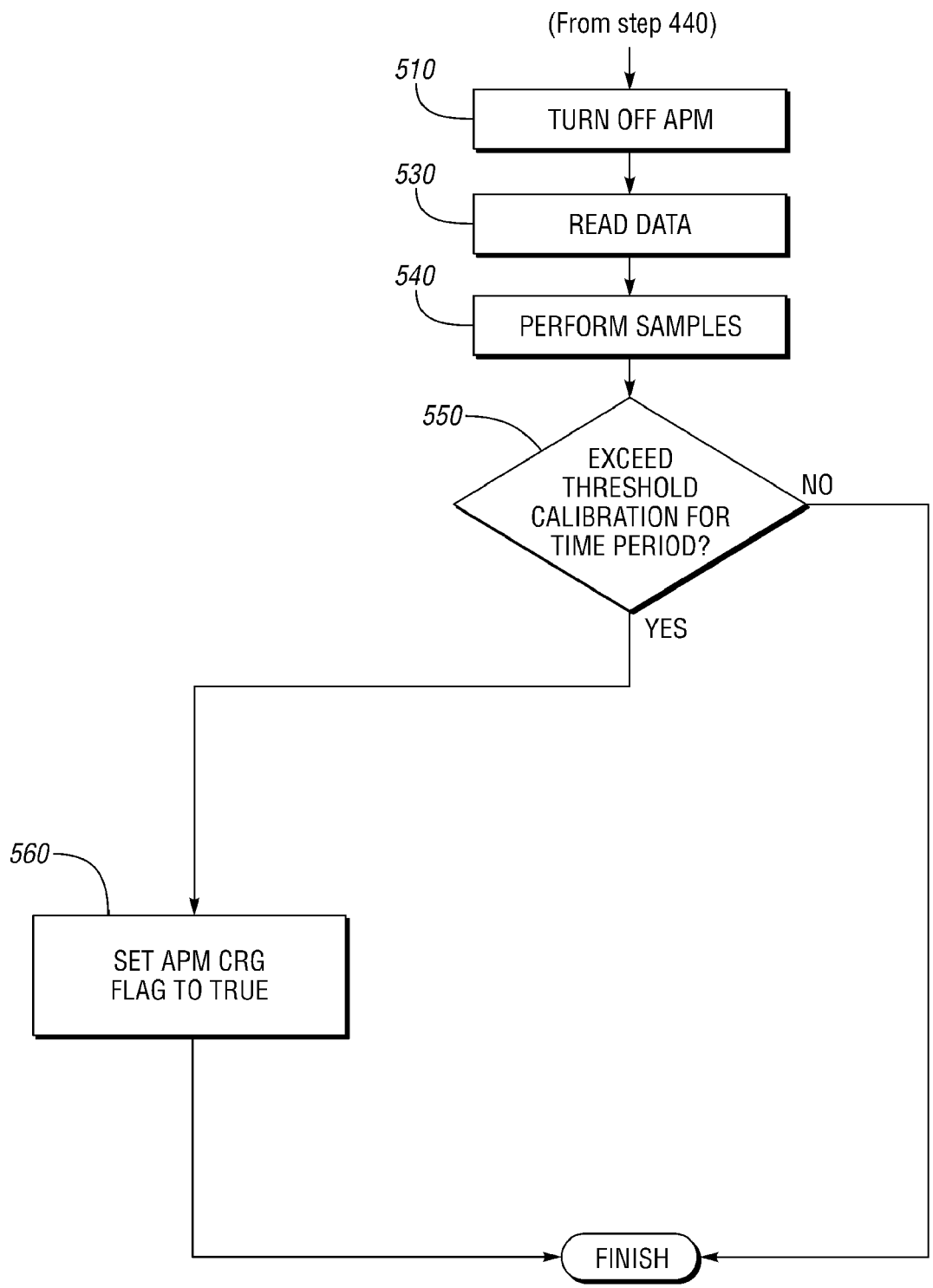
FIG. 4 is a graphical flow chart describing an exemplary set of steps for isolating a failed component within the motor control circuit shown in FIG. 1.

Referring to FIG. 4, an exemplary embodiment of step 500 of the algorithm 100 described above with reference to FIG. 2 effectively isolates the failed component of the motor control circuit 20 of FIG. 1. Beginning with step 510, the controller 50 turns off or powers down the APM 70, effectively eliminating the DC current ($I_{APM}$) from the motor control circuit 20. After the APM 70 has been powered down, the algorithm 100 proceeds to step 530.

At step 530, the controller 50 reads the DC current value from the DC current sensor 30A, but ignores the DC current value from the sensor 30B of the APM 70. The controller 50 also reads or receives the phase current values from the pair of phase current sensors 40A, 40B. The algorithm 100 then proceeds to step 540.

At step 540, the controller 50 performs a sample by calculating the DC current of the PIM 80, i.e., $I_{PIM}$, as explained above. After calculating the value of the DC current ($I_{PIM}$), the algorithm 100 proceeds to step 550.

At step 550, the algorithm 100 calculates or determines the absolute value of $I_{BAT}-I_{INV}$, and, if this absolute value is greater than zero or a low non-zero failure threshold for a given period of time, the controller 50 proceeds to step 560. Otherwise, if the absolute value is zero, step 500 of the algorithm 100 as shown in FIG. 4 is finished, with the algorithm 100 continuing with step 600 in FIG. 2.

At step 560, the algorithm 100 deduces that the root cause of the failure is not the APM 70, but rather one of the HV battery 60 and/or the PIM 80. A flag representing the result can be set to indicate that the APM 70 is not the likely cause of the failure. That is, at step 560, with the APM 70 of FIG. 1 disconnected or powered down, the result of steps 530-550 is a determination that the APM 70 is or is not the likely source or root cause of failure, and in response to this determination a corresponding flag, such as an APM CRF Flag as shown in FIG. 4, or a diagnostic code or other suitable indicator can be set. After setting the flag or diagnostic code, step 500 of algorithm 100 is finished, with the overall algorithm 100 resuming at step 600 of FIG. 2 as described above.

Accordingly, by using the method and apparatus of the present invention, a failed high-voltage electrical component aboard the HEV 10 of FIG. 1 can be automatically diagnosed, and an appropriate control action can be executed that is tailored to the particular diagnosis. Additionally, system cost can be reduced at least in part by eliminating one of the required phase current sensors from the AC-side of the motor control circuit 20, i.e., the output side of the PIM 80.

While the best modes for carrying out the invention have been described in detail, those familiar with the art to which this invention relates will recognize various alternative designs and embodiments for practicing the invention within the scope of the appended claims.

The invention claimed is:

1. A method for diagnosing a high-voltage (HV) fault condition in a hybrid electric vehicle (HEV) having a high-voltage (HV) battery, an accessory power module (APM), a power inverter module (PIM), and a three-phase motor/generator unit (MGU), the method comprising:
measuring a DC output current of the HV battery;
measuring a DC inlet current of the APM;
measuring only a pair of AC phase currents of the MGU;
calculating a DC inlet current of the PIM using the pair of AC phase currents;
diagnosing the HV fault condition as a function of the DC output current of the HV battery and the sum of the DC inlet currents of each of the APM and the PIM; and
executing at least one control action in response to the diagnosed HV fault condition.

2. The method of claim 1, including an HV contactor connected in series with the HV battery, the method further comprising at least one of: verifying that a key position of the HEV is set to run and verifying that the HV contactor is closed.

3. The method of claim 1, wherein diagnosing the HV fault condition includes: subtracting the DC inlet currents of each of the APM and the PIM from the DC outlet current of the HV battery, and taking the absolute value of the result, to thereby determine a value of an instantaneous variable, comparing the value of the instantaneous variable to a calibrated threshold, executing the at least one control action in a one manner when the value of the instantaneous variable is greater than the calibrated threshold, and executing the at least one control action in another manner when the value of the instantaneous variable is less than the calibrated threshold.

4. The method of claim 1, wherein the HEV includes an HV bus, a chassis, and a plurality of current sensors, and wherein the HV fault condition is selected from the group consisting essentially of: an electrical short between the HV bus of the HEV and the chassis, an electrical short in a phase winding of the three-phase motor/generator unit (MGU), and a failure of one of the plurality of current sensors.

5. The method of claim 1, further comprising isolating a failed component aboard the HEV, executing a first control action as the at least one control action when the APM is the failed component, and executing a second control action as the at least one control action when the APM is not the failed component.

6. A method for diagnosing a high-voltage (HV) fault condition in a hybrid electric vehicle (HEV) having a high-voltage (HV) battery, an accessory power module (APM), a power inverter module (PIM), and a three-phase motor/generator unit (MGU), the method comprising:
measuring a DC output current of the HV battery;
measuring a DC inlet current of the APM;
measuring only a pair of AC phase currents of the MGU;
calculating a DC inlet current of the PIM using the pair of AC phase currents;
comparing the DC output current of the HV battery to the sum of the DC inlet currents of the APM and the PIM;
executing a control action in response to the variance between the DC output current of the HV battery and the sum of the DC inlet currents of the APM and the PIM;
wherein executing a control action includes one of: setting a diagnostic code aboard the HEV, activating an audio/visual device within the HEV, and temporarily disabling propulsion of the HEV.

7. The method of claim 6, further comprising:
powering off the APM;
measuring each of the DC output current of the HV battery and the DC inlet current of the PIM while the APM is powered off; and
comparing the DC output current of the HV battery to the DC inlet current of the PIM while the APM is powered off to thereby determine whether the APM is a root cause of the HV fault condition.

8. The method of claim 7, the HEV further including an engine, the method further comprising: determining whether the engine is running, and preventing execution of the method when the engine is not running.

9. The method of claim 8, wherein determining whether the engine of the HEV is running includes at least one of: determining an ignition state of the HEV and determining a state of an HV contactor positioned on the HV bus.

10. The method of claim 7, wherein executing a control action includes disabling propulsion of the HEV only when the APM is determined not to be a root cause of the HV fault condition.

11. A hybrid electric vehicle (HEV) comprising:
a high-voltage (HV) battery;
an accessory power module (APM);
a first DC current sensor configured to measure a DC outlet current of the HV battery;
a second DC current sensor configured to measure a DC inlet current of the APM;
a power inverter module (PIM);
a three-phase AC motor/generator unit (MGU) having a pair of AC phase current sensors adapted to measure only two of the three AC phase currents of the MGU; and
a controller configured for diagnosing a high-voltage (HV) fault condition aboard the HEV;
wherein the controller is operable for calculating a DC inlet current of the PIM using the two AC phase currents, for diagnosing the HV fault condition as a function of the DC outlet current of the HV battery and the sum of the DC inlet currents of each of the APM and the PIM, and for executing at least one control action in response to the diagnosed HV fault condition.

12. The HEV of claim 11, wherein the controller is further operable for determining whether the APM is a root cause of the HV fault condition, and for disabling propulsion of the HEV as the at least one control action when the APM is not a root cause of the HV fault condition.

13. The HEV of claim 11, wherein the controller is operable for diagnosing the HV fault condition by subtracting each of the DC inlet currents of the APM and the PIM from the DC outlet current of the HV battery and taking the absolute value of the result to thereby calculate a value of an instantaneous variable, and by thereafter comparing the value of the instantaneous variable to a calibrated threshold.

* * * * *